[11] 3,593,570

[72] Inventor Richard W
763 Taylor Ave., Alameda, Calif. 94501
[21] Appl. No. 833,085
[22] Filed June 13, 1969
[45] Patented July 20, 1971

[54] ULTRASONIC TESTING DEVICE
4 Claims, 11 Drawing Figs.
[52] U.S. Cl. ................................................. 73/71.5, 310/9.1
[51] Int. Cl. ....................................................... G01n 29/04
[50] Field of Search ........................................ 73/67.5−
−67.9, 71.5; 310/8.1, 8.3, 8.7, 9, 9.1

[56] References Cited
UNITED STATES PATENTS

| | | | |
|---|---|---|---|
| 2,460,153 | 1/1949 | Smoluchowski............... | 73/71.5 X |
| 2,602,101 | 7/1952 | Mesh............................. | 73/71.5 X |
| 2,602,102 | 7/1952 | Webb............................ | 73/71.5 X |
| 2,666,862 | 1/1954 | Branson ........................ | 73/71.5 X |
| 3,257,843 | 6/1966 | Cowan .......................... | 73/71.5 |
| 3,423,993 | 1/1969 | Lynnworth................... | 73/71.5 |

*Primary Examiner*—Richard C. Queisser
*Assistant Examiner*—C. E. Snee
*Attorney*—Mellin, Moore & Weissenberger ABSTRACT: An ultrasonic-testing device including four crystals fixed to a member which may be rotated to a variety of positions. Each crystal when vibrated is adapted to emit ultrasonic waves of a frequency different from the other three. One crystal only is selectively vibrated at any given time, and the position of that vibrated crystal, and thus the direction of ultrasonic waves emitted therefrom, may be varied to an extent by rotation of the member to such variety of positions.

PATENTED JUL 20 1971
3,593,570
SHEET 1 OF 2
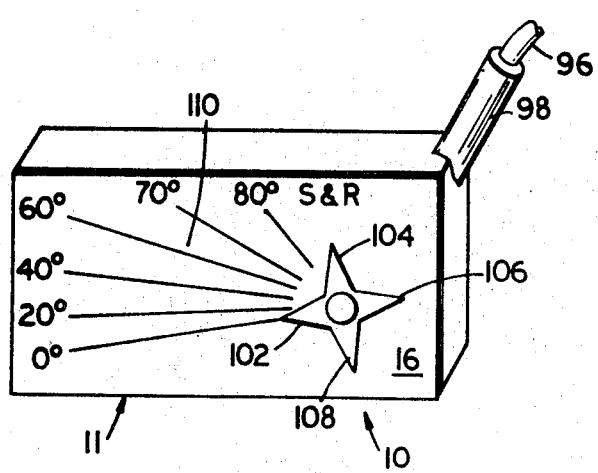
FIG_1
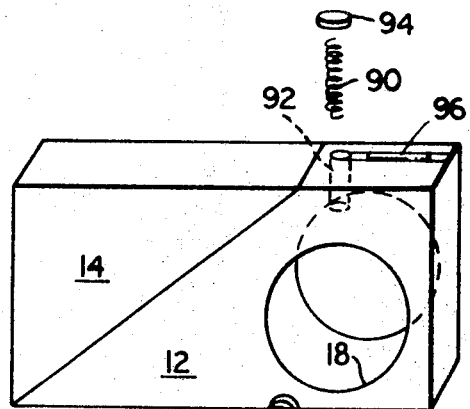
FIG_2
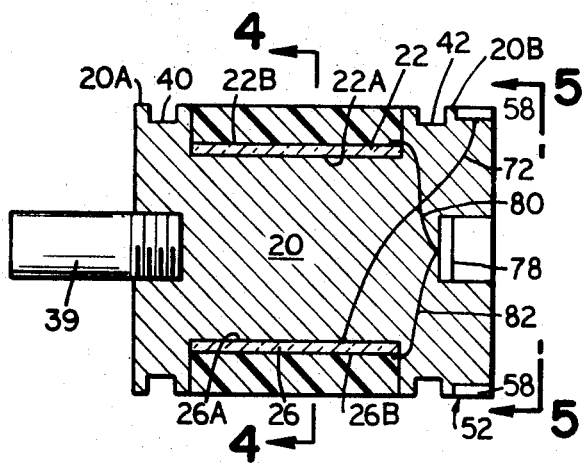
FIG_3
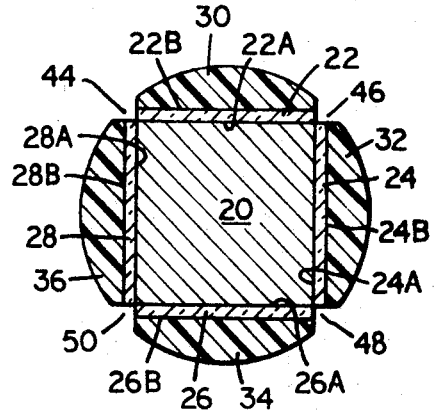
FIG_4
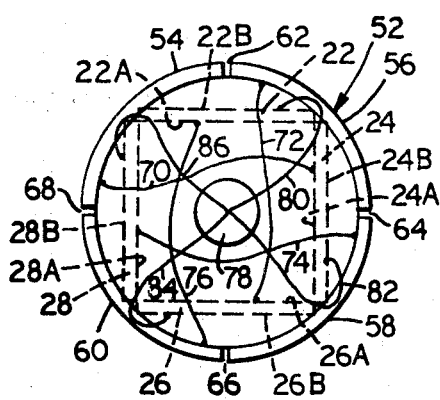
FIG_5
INVENTOR.
RICHARD W. MEGOLOFF
BY
Mellin, Moore + Weissenberger
ATTORNEYS

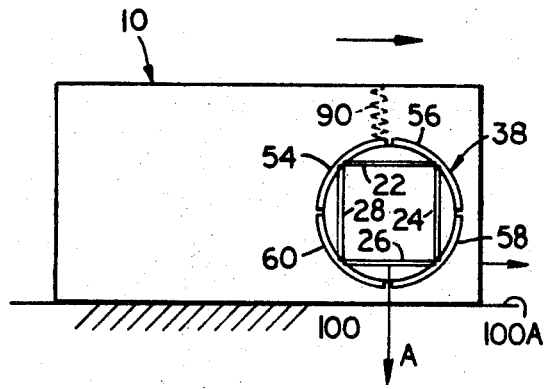
FIG_6
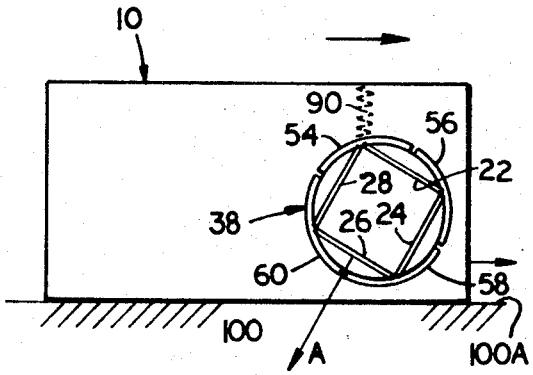
FIG_7
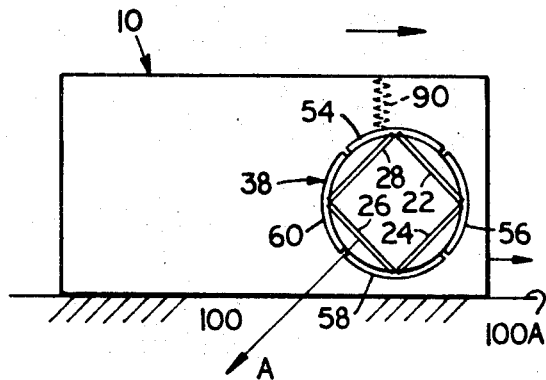
FIG_8
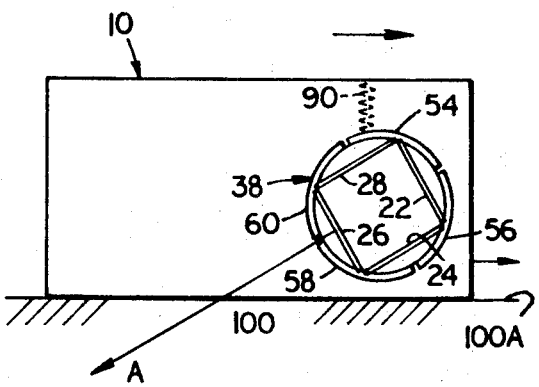
FIG_9
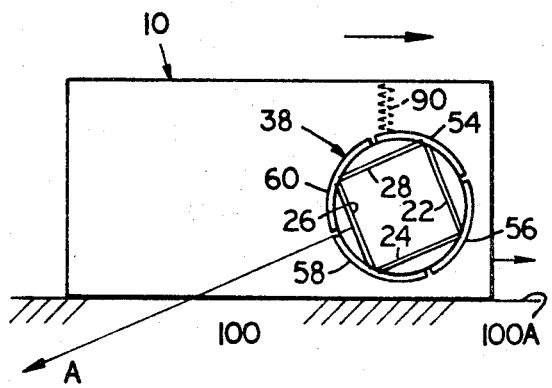
FIG_10
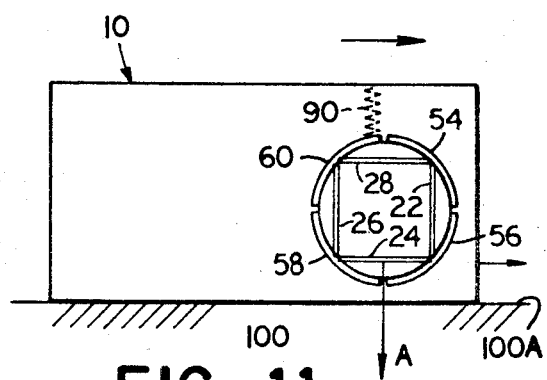
FIG_11

3,593,570

1

ULTRASONIC TESTING DEVICE

BACKGROUND OF THE INVENTION

This invention relates to ultrasonic testing devices, and, more particularly, to a device which may be adjusted to emit various frequency ultrasonic waves in various directions.

Devices which emit ultrasonic waves for purposes of testing materials for cracks or flaws are, of course, well known. A typical device of this type includes a body having fixed thereto a crystal. A series of electrical charges are placed on the crystal, causing the crystal to mechanically vibrate and emit ultrasonic waves in a fixed general direction relative to the crystal and to the body.

In the use of such a device, the body thereof is generally run over the surface of the object to be tested, with the ultrasonic waves from the crystal penetrating the material of the object. A flaw or discontinuity in the object causes a reflection of the ultrasonic beam, and appropriate means, cooperating with the crystal which senses the reflection of the beam, are included for noting the presence and position of such reflection.

Depending on the thickness of the object, the material thereof, and the like, it has been found advantageous to test any given object, or any variety of objects, with ultrasonic beams of various frequencies and in various directions relative to the surface of the object. This is generally done by providing a series of separate testing devices, each having a single-frequency crystal which emits ultrasonic waves in a single general direction. Obviously, the use of such a series of separate testing devices requiring the switching of one for another, is a relatively time-wasting and inconvenient operation.

It is an object of this invention to provide an ultrasonic testing device which is capable of selectively emitting any one of a variety of ultrasonic wave frequencies.

It is a further object of this invention to provide an ultrasonic testing device which, while fulfilling the above object, provides means for adjusting the general direction of the ultrasonic waves emitted therefrom.

It is a still further object of this invention to provide an ultrasonic testing device which, while fulfilling the above objects, is extremely simple and effective in design and convenient in operation.

SUMMARY OF THE INVENTION

Broadly stated, the inventive ultrasonic device disclosed herein comprises a body having a generally cylindrical aperture therethrough. A generally cylindrical rotatable member is disposed in the aperture and is positionable relative thereto in a variety of positions. A plurality of crystals are fixed to the rotatable member, each adapted to emit ultrasonic waves in a fixed general direction relative to itself when vibrated, the rotation of the rotatable member to such plurality of positions varying the general direction of the emitted ultrasonic waves from each crystal relative to the body. Further included is a slipring comprising a plurality of slipring portions which are spaced to define a noncontinuous slipring surrounding the cylindrical member. Wire means interconnect each slipring portion with a crystal. Means are positioned to contact the slipring for applying a series of electrical charges to only the slipring portion thereof contacted, and the crystal connected thereto, such rotatable member being positionable so that any of the other slipring portions alone may be contacted by the contacting means.

BRIEF DESCRIPTION OF THE DRAWINGS

These and other objects of the invention will become apparent from a study of the following specification and drawings, in which:

FIG. 1 is a perspective view of the cover of the device;
FIG. 2 is an exploded perspective view of the internal structure of the device;
FIG. 3 is a sectional view taken along the line 3—3 of FIG. 2;

2

FIG. 4 is a sectional view taken along the line 4—4 of FIG. 3;
FIG. 5 is a view taken along the line 5—5 of FIG. 3, showing the wiring means of the device;
FIGS. 6—11 are a series of schematic elevational views of a portion of the device showing its general use in testing an object.

DESCRIPTION OF THE PREFERRED EMBODIMENT

Shown generally in FIG. 1 is the inventive ultrasonic testing device 10. Making up the body 11 of the device 10 is an inner plastic member 12 having fixed thereto ultrasonic absorbent material 14, and a metal cover 16. The member 12 has a generally cylindrical aperture 18 therethrough.

As shown in detail in FIGS. 3—5, a core 20 has fixed thereto the bottom surfaces 22A, 24A, 26A, 28A of substantially flat crystals 22, 24, 26, 28, in generally perpendicular relation to each other. The end portions 20A, 20B of core 20 are generally cylindrical in configuration. Plastic fillers 30, 32, 34, 36 are fixed to the top surfaces 22B, 24B, 26B, 28B of the crystals 22, 24, 26, 28 respectively, and these fillers, being of semicylindrical configuration, together with the cylindrical end portions 20A, 20B, form a member 38 of generally cylindrical overall configuration, dimensioned to fit into aperture 18 and be rotatable therein to a variety of positions relative to the member 12. Annular grooves 40, 42 are defined about the member 38 at the end portions 20A, 20B. Longitudinal grooves 44, 46, 48, 50 are defined by the adjacent edges of the fillers 30, 32, 34, 36, and communicate with the grooves 40, 42. When fitting the member 38 into aperture 18, O-rings (not shown) are fitted into grooves 40, 42, and a suitable liquid, such as glycerine, is applied to the member 38, filling the grooves 44, 46, 48, 50. Such liquid provides a thin film between the member 38 and the portion of the member 12 defining the aperture 18. The grooves 44, 46, 48, 50 provide a reservoir of liquid, meanwhile allowing space for any air bubbles about the member 38 to dissipate into.

Surrounding member 38 adjacent end portion 20B is a slipring 52. Such slipring is made up of four slipring portions or segments 54, 56, 58, 60 of equal length which are gapped or spaced at 62, 64, 66, 68 to define the slipring 52 in a noncontinuous fashion.

A wire 70 interconnects segment 54 with the bottom surface 24A of crystal 24, a wire 72 interconnects segment 56 with the bottom surface 26A of crystal 26, a wire 74 interconnects segment 58 with the bottom surface 28A of crystal 28, and a wire 76 interconnects segment 60 with the bottom surface 22A of crystal 22. The top surface 22B, 24B, 26B, 28B of the crystals communicate with a metal plate 78 by means of wires 80, 82, 84, 86 and a metal spring 88 is disposed between metal plate 78 and cover 16 when member 38 is disposed in apertures 18 and cover 16 is in place. Such means ensure that the top surfaces 22B, 24B, 26B 28B of the crystals 22, 24, 26, 28 are grounded.

A spring member 90 is positioned in a small bore 92 which communicates with aperture 18, and contacts a segment of slipring 52. An insulating cap 94 is included to keep spring member 90 from contacting cover 16. An electrical cable 96, connnected to an ultrasonic generator (not shown), communicates with spring member 90 through a neck portion 98 of cover 16.

Through spring member 90, a series of electrical charges are applied to the inner surface of any given crystal, depending on which segment of the slipring 52 is contacted by the spring member 90. With such series of charges being applied to one side of the crystal, and the other side of the crystal grounded, mechanical vibrations are set up therein so that ultrasonic waves are emitted. Such ultrasonic waves are emitted in opposite fixed general directions relative to that crystal, but the core 20 material is chosen to absorb the waves being emitted into it.

The emission of such ultrasonic waves from a crystal is shown generally in FIG. 6. Therein, spring member 90 contacts segment 54, causing crystal 26 to vibrate, emitting ultrasonic waves in the general direction A. The absorbent material 14 absorbs internal wave reflections induced by crystal 26, and the cover 16 acts as a shield against stray electrical radiation. An object 100 may be tested for flaws or discontinuities by running the device 10 over the surface 100A of the object 100, the thin liquid film previously described providing continuity between the member 38 and plastic member 12. The ultrasonic waves enter the object 100 and are reflected by a flaw or discontinuity, which may be noted, as is well known.

If it is desired to have the ultrasonic waves from crystal 26 enter the object 100 at a chosen angle of, for example, 30°, member 38 is rotated clockwise by means of a knob 39 extending through an aperture 104 in the cover 16, which varies the general direction A of the emitted ultrasonic waves relative to the body 10 (FIG. 7). As shown in FIG. 1, pointers 102, 104, 106, 108 may be fixed to the knob 39 to indicate on a scale 110 the crystal which is emitting the ultrasonic waves, and the position of that crystal relative to the body 10.

Upon such 30° rotation, segment 54 is still in contact with spring member 90, and so only crystal 26 is activated (FIG. 7). The ultrasonic waves therefrom enter the object 100 at an angle of 30°.

FIGS. 7, 8 and 9 show the member 38 having been rotated to other positions, so that the ultrasonic waves enter the object 100 at angles of 45°60°, and 70°.

When the member 38 is rotated 90° from its position shown in FIG. 6, segment 54 no longer contacts spring member 90, but rather segment 60, causing crystal 24 to vibrate. It will be seen that such member 38 may, of course, be rotated to various positions so that a chosen crystal emits ultrasonic waves in a chosen general direction relative to the body 10. By choosing each crystal to emit its own frequency different from the others, one can accomplish not only variation of the angle of the emitted ultrasonic waves, but also variation from crystal to crystal of the frequency of the emitted ultrasonic waves.

Any one of four frequencies may be easily chosen to suit the material of the object being tested, and any angle between 0° and 90° for each of these frequencies may be easily chosen to suit the configuration and material of the object being tested.

Such changes of frequency and angle are achieved by simple rotation of member 38 by means of knob 39. It will be seen that the device, overall, is extremely simple and effective in design, and convenient in operation.

I claim:

1. An ultrasonic device comprising:
   a. a body having a generally cylindrical aperture therethrough;
   b. a generally cylindrical rotatable member disposed in the aperture and positionable relative thereto in a variety of positions;
   c. a plurality of crystals fixed to the rotatable member, each adapted to emit ultrasonic waves in a fixed general direction relative to itself when vibrated, the rotation of the rotatable member to such plurality of positions varying the general direction of the emitted ultrasonic waves from each crystal relative to the body;
   d. a slipring comprising a plurality of slipring portions which are spaced to define a noncontinuous slipring surrounding the cylindrical member;
   e. wire means interconnecting each slipring portion with a crystal;
   f. means positioned to contact the slipring for applying a series of electrical charges to only the slipring portion thereof contacted, and the crystal connected thereto, such rotatable member being positionable to vary the general direction of the emitted ultrasonic waves from that crystal relative to the body and further being positionable so that any of the other slipring portions alone may be contacted by the contacting means.

2. A device according to claim 1 wherein are further included pointer means fixed to the cylindrical member and extending therefrom and positioned to indicate the position of the rotatable member relative to the body.

3. A device according to claim 2 wherein is included a liquid film about the cylindrical member in the aperture.

4. An ultrasonic device comprising;
   a. a body having a generally cylindrical aperture therethrough;
   b. a generally cylindrical rotatable member disposed in the aperture and positionable relative thereto in a variety of positions;
   c. a plurality of crystals fixed to the rotatable member, each adapted to emit ultrasonic waves in a fixed general direction relative to itself when vibrated, the rotation of the rotatable member to such plurality of positions varying the general direction of the emitted ultrasonic waves from each crystal relative to the body, each of said crystals having a frequency of vibration different from the others;
   d. means for connecting a preselected one of said crystals to, and disconnecting the remainder of said crystals from, a source of electrical energization throughout a predetermined range of rotation of said rotatable member relative to said body.